(12) United States Patent
Tokuhara et al.

(10) Patent No.: US 7,283,174 B2
(45) Date of Patent: Oct. 16, 2007

(54) VIDEO SIGNAL PROCESSING APPARATUS, VIDEO SIGNAL PROCESSING METHOD AND VIDEO SOURCE DETERMINING METHOD

(75) Inventors: Masaharu Tokuhara, Kanagawa (JP); Toshio Sarugaku, Chiba (JP); Naoki Kaneko, Kanagawa (JP); Seiko Imai, Chiba (JP)

(73) Assignee: Sony Corporation (JP)

( * ) Notice: Subject to any disclaimer, the term of this patent is extended or adjusted under 35 U.S.C. 154(b) by 454 days.

(21) Appl. No.: 10/475,732

(22) PCT Filed: Apr. 23, 2002

(86) PCT No.: PCT/JP02/04026

§ 371 (c)(1),
(2), (4) Date: May 6, 2004

(87) PCT Pub. No.: WO02/089477

PCT Pub. Date: Nov. 7, 2002

(65) Prior Publication Data

US 2004/0212733 A1 Oct. 28, 2004

(30) Foreign Application Priority Data

Apr. 24, 2001 (JP) ............................. 2001-126157
Apr. 27, 2001 (JP) ............................. 2001-132886

(51) Int. Cl.
*H04N 7/01* (2006.01)
*H04N 11/20* (2006.01)

(52) U.S. Cl. ..................... 348/448; 348/441; 348/452; 348/700; 348/911

(58) Field of Classification Search ................. 348/448, 348/441, 447, 451–452, 700, 459, 97, 558, 348/911, 701–702, 722; *H04N 7/01, 11/20*
See application file for complete search history.

(56) References Cited

U.S. PATENT DOCUMENTS 4,982,280 A * 1/1991 Lyon et al. .................. 348/448

(Continued)

FOREIGN PATENT DOCUMENTS

JP 11-88845 A1 3/1999

(Continued)

*Primary Examiner*—Trang U. Tran
(74) *Attorney, Agent, or Firm*—Lerner, David, Littenberg, Krumholz & Mentlik, LLP

(57) ABSTRACT

There is provided a video signal processing apparatus that makes it possible to realize a favorable display of pictures by increasing the detection accuracy of the video source of an input video signal and by using an appropriate scanning method for an output video signal in accordance with the determined type of video source. The video signal processing apparatus includes video source determining means for determining whether the video source of a video signal is a film source, calculating means for calculating a degree of difference between a picture of a field of the video signal and a picture of a field of a delayed video signal, threshold setting means, comparison means for comparing the degree of difference and a threshold and determining whether the pictures of each field match, and a signal pattern detecting means for detecting a signal pattern of a signal outputted by the comparison means and determining whether the video source is a film source, with the threshold setting means outputting respectively different thresholds in a state where the video source is determined to be a film source and a state where the video source is not determined to be a film source.

8 Claims, 10 Drawing Sheets

U.S. PATENT DOCUMENTS

| | | | | |
|---|---|---|---|---|
| 5,596,371 | A | * | 1/1997 | Pakhchyan et al. ......... 348/452 |
| 6,014,182 | A | * | 1/2000 | Swartz ....................... 348/700 |
| 6,597,402 | B1 | * | 7/2003 | Butler et al. ................ 348/447 |
| 6,891,571 | B2 | * | 5/2005 | Shin et al. .................. 348/448 |

FOREIGN PATENT DOCUMENTS

| | | |
|---|---|---|
| JP | 11-341444 A1 | 12/1999 |
| JP | 2001-169252 A1 | 6/2001 |

* cited by examiner

FIG. 1
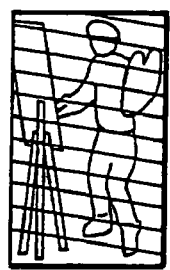 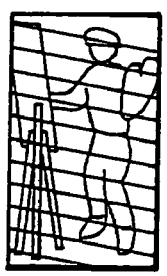 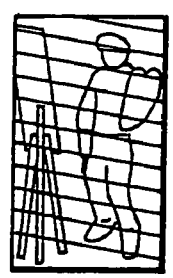 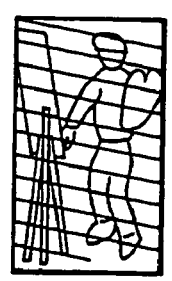 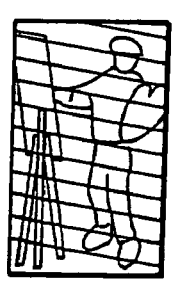
a     b'     c     d'     e

| Fin | a | a' | a | b' | b | c' | c | c' | d | d' | e | e' |
|-----|---|----|----|----|----|----|----|----|----|----|----|----|
| F1  | z'| a  | a' | a  | b' | b  | c' | c  | c' | d  | d' | e  |
| F2  | z | z' | a  | a' | a  | b' | b  | c' | c  | c' | d  | d' |
| C1  | 0 | 1  | 0  | 0  | 1  | 0  | 1  | 0  | 0  | 1  | 0  | 1  |
| Fa  | z | a' | a  | a' | b  | b' | c  | c' | c  | d' | d  | e' |
| Fb  | z'| a  | a' | a  | b' | b  | c' | c  | c' | d  | d' | e  |
| Fc  | z | a' | a  | a' | b  | b' | c  | c' | c  | d' | d  | e' | ced
VIDEO SIGNAL PROCESSING APPARATUS, VIDEO SIGNAL PROCESSING METHOD AND VIDEO SOURCE DETERMINING METHOD

TECHNICAL FIELD

The present invention relates to a video signal processing apparatus and a video signal processing method that make it possible to display pictures at high resolution, and in particular relates to a video signal processing apparatus and a video signal processing method that double the scan lines in a field provided by a video signal to increase resolution, and change the scan method of the output video signal in accordance with the type of video source.

BACKGROUND ART

Conventionally, a method that increases the vertical resolution of pictures by increasing the number of scan lines in the vertical direction in each field is known as a method for improving the picture quality of video signals that are provided based on methods such as NTSC and PAL. In a line doubling device that performs such processing, three input signals are inputted and a video signal with double the number of scan lines is generated.

The scan line doubling process that generates a field in which the number of scan lines has been doubled from a plurality of video signals in this way is composed so as to change the combination of video signals supplied to the line doubling device in accordance with the video source of the input video signal. In a case where the video source of the input video signal is a video source that supplies a different picture in each field, such as a normal broadcast signal or an output signal from a video camera according to NTSC or the like, the video signals for three consecutive fields are supplied to the line doubling device using a delay means and the correlation between fields and the correlation within fields are used to generate fields with double the number of scan lines.

FIG. 1 shows pictures of fields that are consecutively outputted from this kind of video source. In FIG. 1, the fields specified by symbols such as a, c, e to which a dash has not been appended indicate the odd-numbered fields in a frame, while the fields specified by symbols such as b', d' to which a dash has been appended indicate the even-numbered fields in the frame. It should be noted that dashes appended to symbols specifying fields also have the same meaning in the following explanation. As one example, in a case where an interlaced (525*i*) picture with 525 scan lines per frame is converted into a progressive scan (525*p*) picture with 525 scan lines per frame, a progressive scan picture with 525 lines per field is obtained by performing predetermined signal processing on pictures, for example the picture of field a (262.5 scan lines), the picture of field b' (262.5 scan lines), and the picture of field c (262.5 scan lines), that are provided as consecutive interlaced pictures.

Furthermore, in the case where an NTSC video signal that has been generated based on a movie film is the video source (hereinafter, this is referred to as a "film source"), since an NTSC video signal has 30 frames per second (60 fields per second) as opposed to a movie film that has 24 frames per second, a field conversion process called a 3-2 pull-down is performed to generate an NTSC video signal based on the movie film. FIG. 2 shows a field conversion operation based on a 3-2 pull-down. In FIG. 2, FIG. 2A shows the pictures of two consecutive frames and FIG. 2B shows the pictures of five consecutive fields. In this way, three consecutive fields a, a', a are generated from the first frame and two consecutive fields b', b are generated from the second frame.

When a film source is the video source, in view of the special characteristics of the video signal described above, three video signals, made up of a video signal of the odd-numbered field, a video signal of the even-numbered field, and a video signal of the odd-numbered field generated from the same frame, or alternatively a video signal of the even-numbered field, a video signal of the odd-numbered field, and a video signal of the even-numbered field generated from the same frame, are supplied in synchronization to the line doubling device as described later. Accordingly, since the combination of video signals supplied to the line doubling device differs between the case when a film source is the video source and the case when a film source is not the video source, if a film source is used as the video source and video signals of three consecutive fields are inputted into the line doubling device, problems such as a lowering of resolution occur and it is not possible to perform the line doubling process effectively.

It should be noted that when a PAL video signal is generated based on a movie film, in the same way a field conversion process called a "2-2 pull-down" is performed. While a movie film has 24 frames per second, a PAL video signal has 50 fields per second, so that two consecutive fields are generated from the video of each frame.

Accordingly, in a video signal processing apparatus that includes a line doubling device, the video source of an input video signal is determined, and different combinations of video signals are supplied to the line doubling device in a case where the video source is a film source and in a case where the video source is not a film source, so that high resolution fields in which the number of scan lines has been doubled are generated, thereby increasing the resolution.

However, a video signal processing apparatus that includes a conventional line doubling device is constructed as described above, and in a case where the judgment performed for the video source of the input video signal has low accuracy or when a suitable scanning method is not used for the output video signal in accordance with the determined type of video source, there has been the problem that it has not been possible to display a favorable picture on a television receiver based on the output video signal obtained from the line doubling device.

DISCLOSURE OF THE INVENTION

It is an object of the present invention to provide a video signal processing apparatus and a video signal processing method that make it possible to display favorable pictures on a television receiver by increasing the accuracy of a determination relating to the video source of an input video signal and by using an appropriate scanning method for an output video signal in accordance with the determined type of video source.

In the video signal processing apparatus and the video source determining method according to the present invention, a calculating means calculates the degree of similarity or degree of difference between the picture of a field provided by a video signal and the picture of a field provided by a delayed video signal produced by delaying the video signal by the equivalent of two fields, the threshold setting means outputs a threshold for determining whether the pictures in each field match, the comparison means compares a calculated value relating to the degree of similarity or degree of difference with the threshold, determines whether the pictures of each field match, and outputs a compare signal showing that the pictures match or do not match, and the signal pattern detecting means detects a signal pattern for the compare signal and determines whether the video source is a film source. By doing so, it is possible to set an appropriate threshold corresponding to a variety of reception conditions, video signal input states, etc., and it is possible to flexibly set the conditions used when determining whether the pictures of fields match or do not match, so that the probability of detecting a signal pattern showing that the video source is a film source can be increased, which has the effect of making it possible to supply a line doubling device with an appropriate combination of video signals with a high probability and to supply favorable pictures.

In the video signal processing apparatus and the video source determining method according to the present invention, a state that changes according to a determination result relating to the video source is specified in the state transition means, and different thresholds are outputted in at least two states that are a state where the video source is determined to be a film source and a state where the video source is determined to not be a film source. By doing so, by setting a threshold in accordance with the determination result relating to the video source, the probability of detecting a signal pattern showing that the video source is a film source can be increased, which has the effect of making it possible to supply a line doubling device with an appropriate combination of video signals with a higher probability and to supply favorable pictures.

In the video signal processing apparatus and the video source determining method according to the present invention, in the threshold setting means, in a state where following the video source being determined to be a film source, a predetermined time is yet to pass after the video source has been determined to not be a film source, a threshold in accordance with said state is outputted. By doing so, there is an increase in the types of state that can be specified in accordance with the determination result for the video source, and by setting an appropriate threshold in accordance with the respective states, it is possible to increase the probability of detecting a signal pattern showing that the video source is a film source, which has the effect of making it possible to supply a line doubling device with an appropriate combination of video signals with a higher probability and to supply favorable pictures.

In the video signal processing apparatus and the video source determining method according to the present invention, in the threshold setting means, in one or a plurality of states, respectively different thresholds are outputted in a case where the pictures of the fields are predicted to match and in a case where the pictures of the fields are predicted to not match. By doing so, it is possible to optimize the setting of the thresholds based on predictions of whether the pictures of fields match or do not match after the video source has initially been determined to be a film source, and it is possible to increase the probability of detecting a signal pattern showing that the video source is a film source, which has the effect of making it possible to supply a line doubling device with an appropriate combination of video signals with a higher probability and to supply favorable pictures.

In the video signal processing apparatus and the video signal processing method according to the present invention, when the video source has been determined to be a film source, the line doubling means outputs a video signal using progressive scanning. By doing so, there is the effect that the occurrence of line flicker is avoided and favorable pictures can be provided.

In the video signal processing apparatus and the video source determining method according to the present invention, a noise level detecting means detects the noise level of the video signal and in one or a plurality of states, the threshold setting means sets different thresholds in accordance with the noise level. By doing so, the conditions for determining whether the pictures of fields match are relaxed, so that even in cases where noise is included in the video signal, the probability of detecting a signal pattern showing that the video source is a film source can be increased, which has the effect of making it possible to supply a line doubling device with an appropriate combination of video signals with a high probability and to supply favorable pictures.

The video signal processing apparatus according to the present invention includes a scanning method indicating means that inputs a determination signal showing whether the video source is a film source from the video source determining means and outputs a signal indicating a scanning method for a video signal outputted by the line doubling means, and the scanning method indicating means includes an automatic progressive indicating means for indicating progressive scanning as the scanning method when the video source has been determined to be a film source. By doing so, when the video source has been determined to be a film source, progressive scanning can be automatically indicated as the scanning method for the video signal outputted from the line doubling means, so that there is the effect that line flicker can be reliably avoided and favorable pictures can be provided.

In the video signal processing apparatus according to the present invention, the scanning method indicating means includes a user selection means that indicates the scanning method in accordance with a user selection in a case where the video source is determined to not be a film source and the automatic progressive indicating means has been made impotent. By doing so, the scanning method for the video signal outputted from the line doubling means can be indicating in accordance with a user selection, so that there is the effect that the functionality of the video signal processing apparatus can be increased further.

BRIEF DESCRIPTION OF DRAWINGS

FIG. 1 shows pictures of fields that are consecutively outputted from a video source that is not a film source.

BEST MODE FOR CARRYING OUT THE INVENTION

The following describes several embodiments of the present invention with reference to the attached drawings.

An Exemplified Practical Embodiment 1

Figure 2:
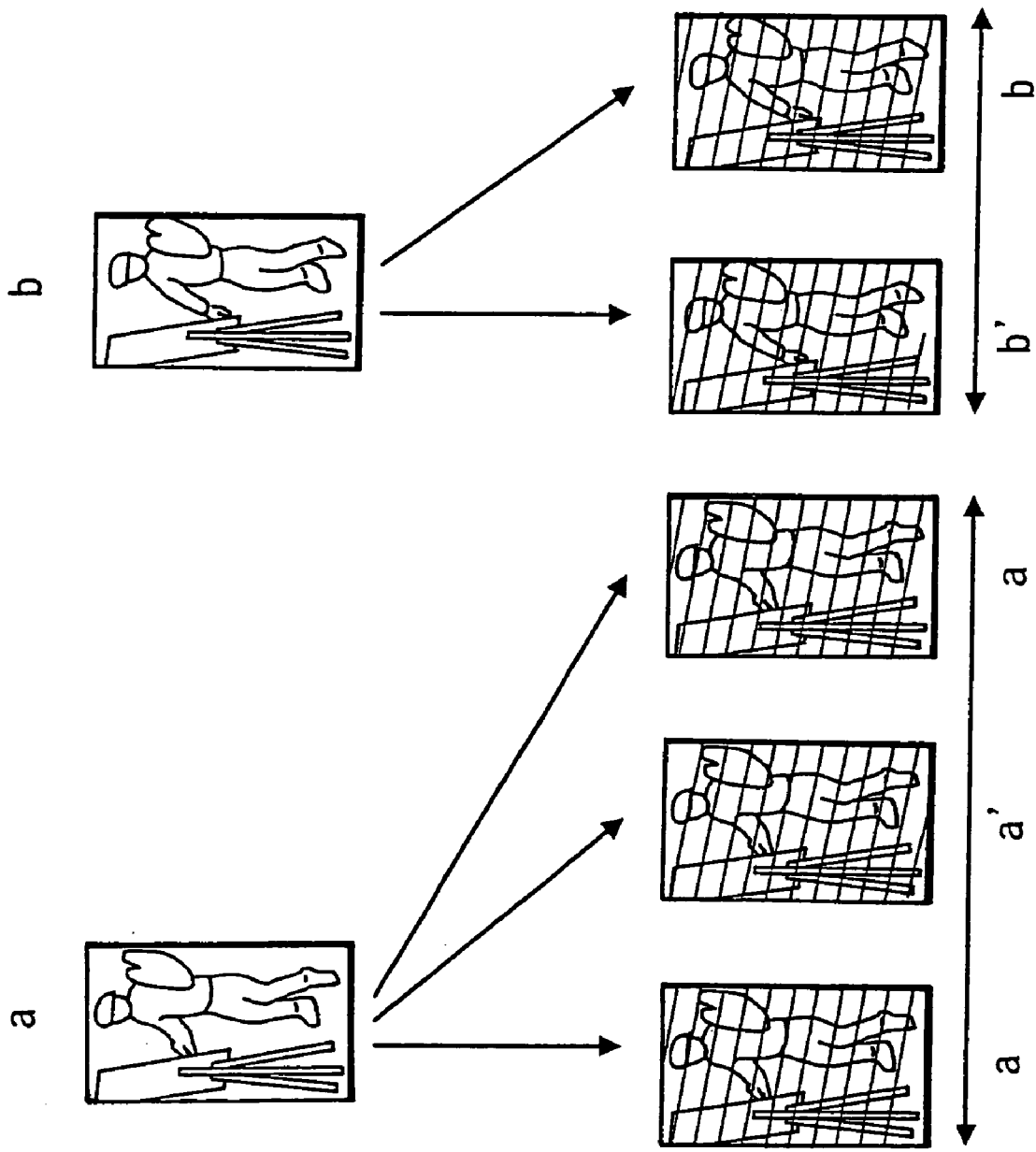
FIG. 2 shows a field conversion operation based on a 3-2 pull-down.
Figure 3:
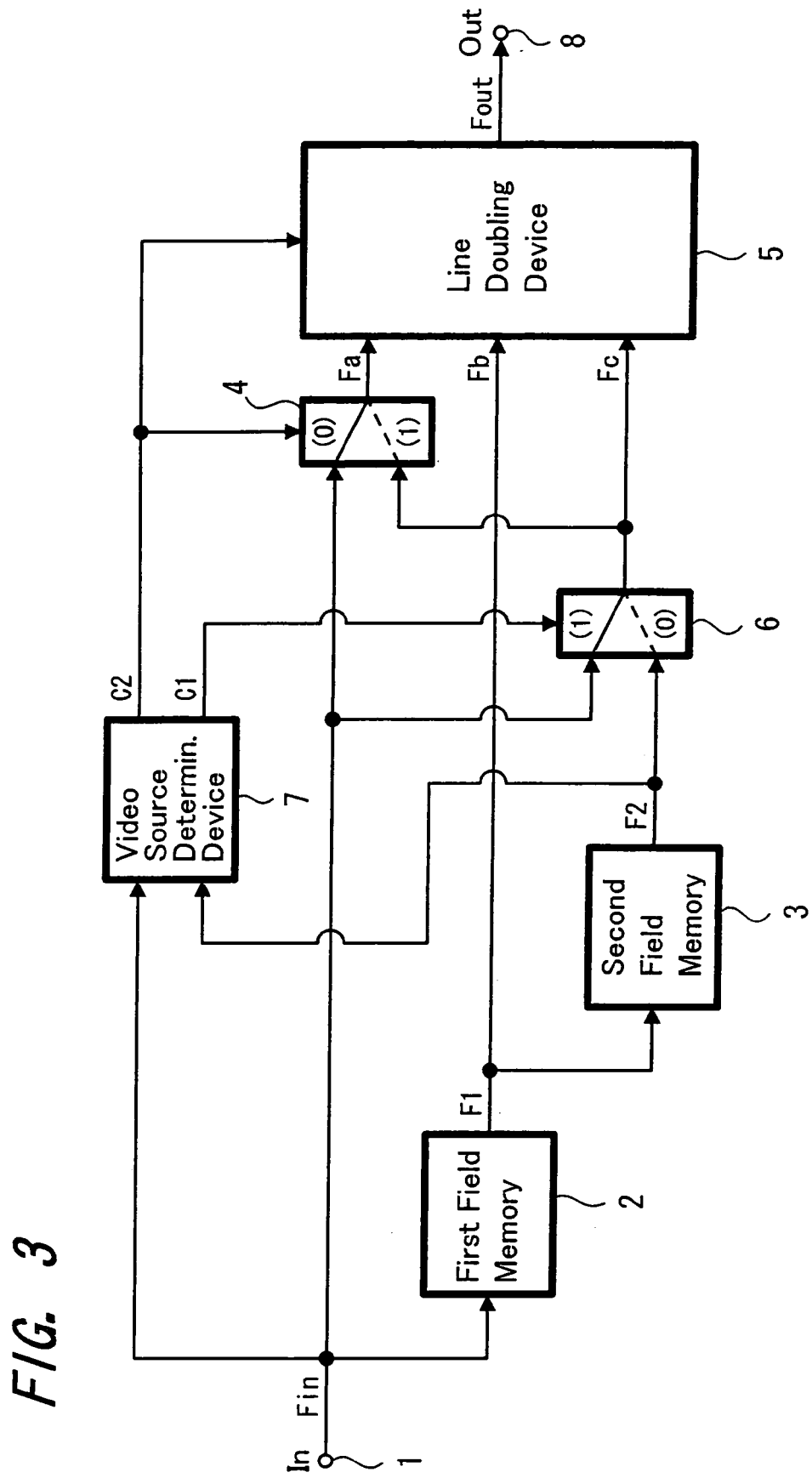
FIG. 3 is a block diagram showing the video signal processing apparatus according to the first embodiment of the present invention.

FIG. 3 is a block diagram showing a video signal processing apparatus according to a first embodiment of the present invention. In FIG. 3, reference numeral 1 denotes an input terminal for inputting a video signal, reference numeral 2 denotes a first field memory for inputting a video signal, delaying the video signal for the time required to input a video signal for one field into the input terminal 1, and then outputting the video signal, reference numeral 3 denotes a second field memory for inputting a video signal, delaying the video signal for the time required to input a video signal for one field into the input terminal 1, and then outputting the video signal, reference numeral 4 denotes a switching circuit that has two inputs and one output and selectively outputs an input signal that has been inputted into one of the inputs in accordance with a control signal, reference numeral 5 denotes a line doubling device (line doubling means) that inputs three video signals, generates a field with double the number of scan lines, and outputs a video signal according to one of an interlaced scanning method or a progressive scanning method, reference numeral 6 denotes a switching circuit that has two inputs and one output and selectively outputs an input signal that has been inputted into one of the inputs in accordance with a control signal, reference numeral 7 denotes a video source determining device (video source determining means) that inputs the video signal Fin inputted into the input terminal 1 and a video signal produced by delaying the video signal Fin by the equivalent of two fields and determines whether the video source of the input video signal is a film source, and reference numeral 8 is an output terminal that outputs the video signal from the line doubling device.

The video signal outputted from the first field memory 2 after being delayed by the equivalent of one field is "F1", the video signal outputted from the second field memory 3 after being further delayed by the equivalent of one field is "F2", the first video signal inputted into the line doubling device 5 is Fa, the second video signal is Fb, and the third video signal is Fc. As can be understood from FIG. 3, Fb=F1. The switching circuit 6 inputs the video signal Fin and the video signal F2, outputs the video signal Fin when a control signal C1 shows the binary data "1", and outputs the video signal F2 when the control signal C1 shows the binary data "0". The switching circuit 4 inputs the video signal Fin and the video signal Fc, outputs the video signal Fin when a control signal C2 shows the binary data "0", and outputs the video signal Fc when the control signal C2 shows the binary data "1".

Figures 4, 5:
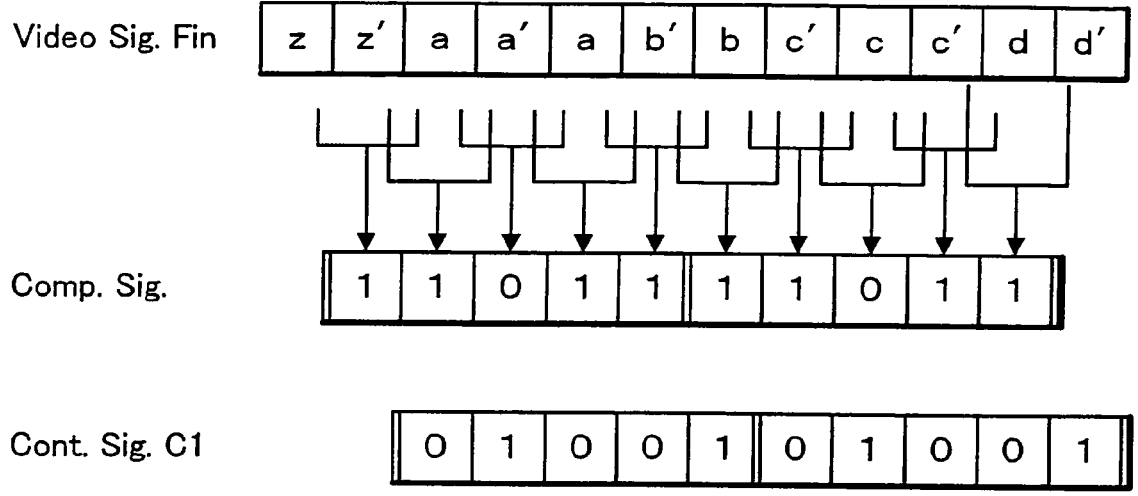
FIG. 4 shows the processing steps relating to a determination of the video source.
FIG. 5 shows the changes in the video signal when the video source is a film source.

Next, the operation of the video signal processing apparatus shown in FIG. 3 is described. When an input signal is inputted into the input terminal 1, the video source determining device 7 inputs the video signal Fin and the video signal F2 that has been delayed by the equivalent of two fields, and performs a determination of whether the video source is a film source. FIG. 4 shows the processing relating to the determination of the video source. In the present embodiment, the video signal Fin inputted into the input terminal 1 is divided into fields in a time series and is expressed as . . . z, z', a, a', a, b', b, c', c, c', d, d', . . . In the video source determining device 7, it is determined whether the pictures in each field match, and a compare signal that is "0" when the pictures match and "1" when the pictures do not match is generated. As shown in FIG. 4, when the video source is a film source, a signal pattern can be obtained for the compare signal where "0" is outputted once every five fields and "1" is outputted at other times. Also, when the video source is not a film source, the picture of each field is completely different, so that a signal pattern can be obtained for the compare signal where only "1" is outputted all of the time. Accordingly, by detecting the signal pattern of the compare signal, it is possible to determine whether the video source is a film source.

When the video source has been determined to be a film source, "1" is outputted to the switching circuit 4 as the control signal C2, and the video signal Fa is made the same as the video signal Fc. Also, as the control signal C1 for the switching circuit 6, in the same way as (a, a', a, b', b) shown in FIG. 4, for example, "0", "1", "0", "0", and "1" are outputted in order for the pictures of the respective fields as a repeated unit of five consecutive field pictures that are composed of pictures for three fields and pictures for two fields that have been generated from the same frames in the movie film. When "1" has been outputted as the control signal C1, the switching circuit 6 outputs the video signal Fin, so that the video signals Fa, Fb, Fc that are inputted into the line doubling device 5 are Fin, F1, Fin. Also, when "0" has been outputted as the control signal C1, the switching circuit 6 outputs the video signal F2, so that the video signals Fa, Fb, Fc that are inputted into the line doubling device 5 are F2, F1, F2.

FIG. 5 shows the changes in each of the video signals when the video source is a film source. As shown in FIG. 5, the combination of the video signal Fa (video signal Fc) and the video signal Fb is definitely a combination of an odd-numbered field and an even-numbered field that are generated from the same frame, so that in the line doubling device 5, signal processing is performed for an odd-numbered field and an even-numbered field that are generated from the same frame, thereby achieving a line doubling process that generates a field with double the number of scan lines.

When the video source has been determined not to be a film source, "0" is outputted to the switching circuit 4 as the control signal C2, which has the video signal Fin outputted as the video signal Fa. Also "0" is outputted to the switching circuit 6 as the control signal C1, which has the video signal F2 outputted as the video signal Fc. By doing so, the video signals Fa, Fb, Fc that are inputted into the line doubling device 5 become Fin, F1, F2 respectively. In the line doubling device 5, the correlation between fields and the correlation within fields are used to perform a predetermined signal process on the three consecutive fields to generate a field with double the number of scan lines.

Figure 6:
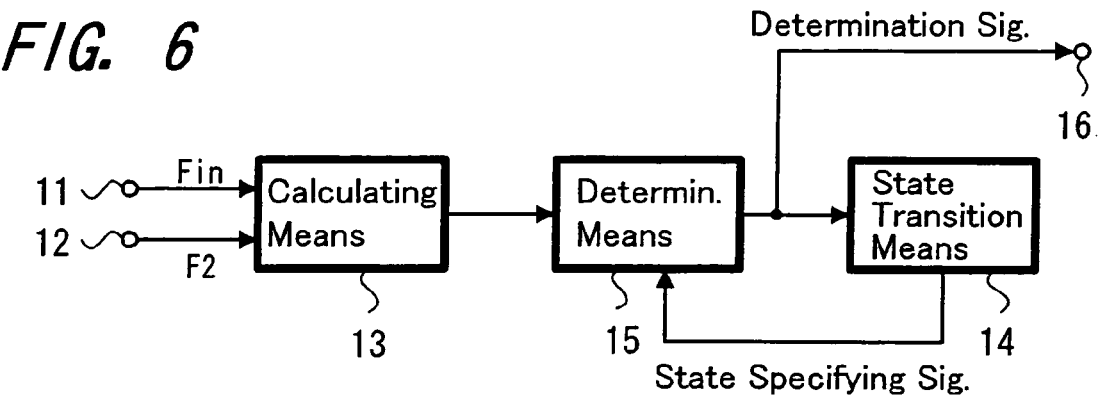
FIG. 6 is a block diagram showing the construction of a video source determining device.

Next, the video source determining device that determines the type of video source is described. FIG. 6 is a block diagram showing the construction of the video source determining device. In FIG. 6, reference numeral 11 denotes an input in which the video signal Fin is inputted, reference numeral 12 denotes another input in which the video signal F2 is inputted, reference numeral 13 denotes a calculating means that compares the video signal Fin and the video signal F2 for each field and outputs a signal showing a value that expresses the degree of difference between the pictures of the fields, reference numeral 14 denotes a state transition means that inputs a determination signal showing whether the video source is a film source and specifies a state that changes in accordance with the determination result, etc., relating to the video source, etc., reference numeral 15 denotes a determination means that compares the value showing the degree of difference that is outputted from the calculating means 13 and a threshold set in accordance with the state specified by the state transition means 14, generates a compare signal that determines whether the pictures of each field match or do not match, and also compares the signal pattern for this compare signal with a predetermined pattern, which is to say, {"1", "1", "0", "1", "1"} and determines whether the video source is a film source, and reference numeral 16 denotes an output from which a determination signal from the determination means 15 is outputted.

Figure 7:
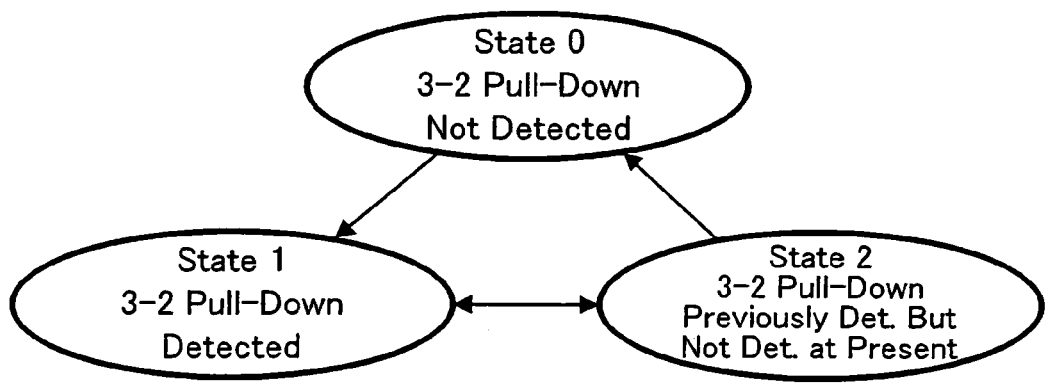
FIG. 7 shows the states that are set and the transitions between states in the state transition means.

Here, regarding the states specified in accordance with the determination result of the state transition means 14, a plurality of states can be defined in accordance with the detection result for a signal pattern for the compare signal obtained when the video source is a film source (hereinafter referred to as the "film source signal pattern" where appropriate), which is to say, the signal pattern of the compare signal where "0" is outputted once every five fields. FIG. 7 shows the states that are set by the state transition means and the transitions between states. As shown in FIG. 7, in the state transition means 14, a state (state 0) where the film source signal pattern is not detected, a state (state 1) where the film source signal pattern is detected, and a state (state 2) where following the detection of the film source signal pattern, the film source signal pattern is no longer detected but a predetermined time is yet to pass are defined, with the transitions shown by the arrows in FIG. 7 being possible between the respective states. In state 0 or state 2, when the film source signal pattern is detected, there is a transition to state 1. In state 1, when the film source signal pattern is no longer detected, there is a transition to state 2. Also, when state 2 continues for the predetermined time or more, there is a transition from state 2 to state 0.

Figure 8:
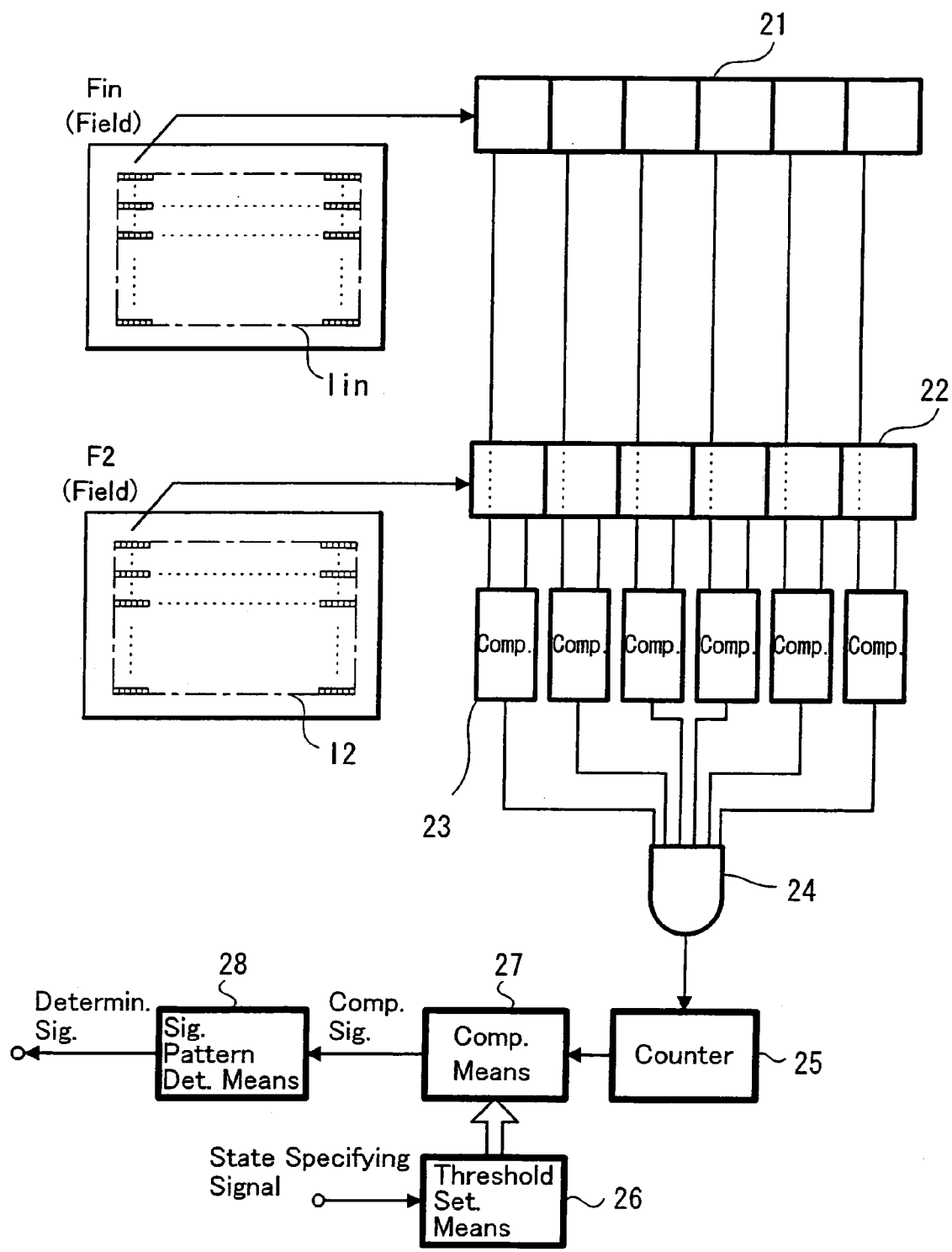
FIG. 8 shows the constructions of the calculating means and the determination means.

Next, the detailed construction of the calculating means and the determination means mentioned above are described. FIG. 8 shows the constructions of the calculating means and the determination means. In FIG. 8, reference numeral 21 denotes a storage means into which video data of six pixels are successively written from the picture of a field provided by the video signal Fin, reference numeral 22 denotes a storage means into which video data of six pixels are successively written from the picture of a field provided by the video signal F2, reference numeral 23 denotes comparators that compare the pixel data of the video signal Fin and the pixel data of the video signal F2 for each pixel and determine whether the pixel data match, reference numeral 24 denotes an AND gate, reference numeral 25 denotes a counter that realizes, in synchronization with the timing at which the pixel data for each pixel is latched, a counting operation where a count value is incremented by one whenever the output from the AND gate 24 is "1", reference numeral 26 is a threshold setting means that inputs a signal specifying a state in accordance with the determination result from the state transition means 14, which is to say, the state specifying signal that shows one state out of state 0, state 1, and state 2, and outputs a threshold for determining whether the picture of the field provided by the video signal Fin and the picture of the field provided by the video signal F2 match or do not match, reference numeral 27 denotes a comparison means that compares the count value showing the degree of difference that is outputted from the counter 25 and the threshold outputted from the threshold setting means 26 and determines whether the pictures in each field match, and reference numeral 28 is a signal pattern detecting means that detects a signal pattern for the compare signal outputted from the comparison means 27 and determines whether the video source is a film source based on a comparison between the detected signal pattern and the film source signal pattern. It should be noted that the storage means 21, the storage means 22, the comparators 23, the AND gate 24, and the counter 25, etc., compose a calculating means that calculates, for each field, the degree of difference between the picture of the field provided by the video signal Fin and the picture of the field provided by the video signal F2. Furthermore, the threshold setting means 26, the comparison means 27, and the signal pattern detecting means 28, etc., compose a determination means that inputs the degree of difference between pictures that is calculated for each field and determines whether the video source is a film source.

Next, the operation of the video source determining device is described. The video source determining device 7 inputs the video signal Fin and the video signal F2, sets a video frame Iin and a video frame I2 for determining whether the pictures match, successively extracts pixel data for each of six pixels in the same position in the respective fields from the video frame Iin and the video frame I2, and stores this pixel data in the storage means 21 and the storage means 22. Here, the units that are composed of sets of six pixels and are compared with one another are called "pixel blocks". Also, as one example, when the luminance signal included in the video signal is expressed using eight bits, the upper five bits may be provided as the video data. The reason that the upper bits are selected is that even if noise becomes mixed in the video signal due to deterioration, etc., of the video signal on a transfer path, this can be prevented from having an effect on the comparison result relating to whether the picture blocks match. It should be noted that in FIG. 8, to simplify the drawing the storage means 21 and the storage means 22 are shown as six-bit registers that store one-bit data for each pixel, though for example when five-bit data is provided as the pixel data as described above, the storage means 21 and the storage means 22 can each be constructed of five registers. It should be noted that it is possible to freely set the number of pixel blocks by changing the sizes of the video frames as appropriate, with 500 blocks being used here as an example. The number of pixels that composes each pixel block is also not limited to six.

The comparators 23 input five-bit pixel data relating to pixels in the same positions in the respective fields for the video signal Fin and the video signal F2, and output "0" when each bit matches, which is to say, the two pieces of pixel data completely match, and output "1" when the two pieces of pixel data do not completely match. The AND gate 24 inputs the output data from the six comparators and outputs "1" when the pixel data do not match for any of the pixels in the six-pixel picture block, and outputs "0" when the pixel data matches for at least one pixel. Whenever pixel blocks are extracted, the counter 25 increases the count value by one whenever the output of the AND gate 24 is "1" and does not change the count value when the output of the AND gate 24 is "0". Accordingly, when comparing the pictures in each field, the count value of the counter has a value between 0 and 500, and when the pixels in the video frames do not match at all, the count value is 500.

The threshold setting means 26 sets an appropriate threshold based on the state specifying signal inputted from the state transition means 14 and outputs a signal showing the set threshold. The comparison means 27 compares, for each field, the count value outputted from the counter 25 and the threshold outputted from the state transition means 14, determines that the field provided by the video signal Fin does not match the field provided by the video signal F2 when the count value becomes larger than the threshold and outputs "1" as the compare signal, and determines that the field provided by the video signal Fin matches the field provided by the video signal F2 when the count value is equal to or less than the threshold and outputs "0" as the compare signal. The signal pattern detecting means 28 detects the signal pattern of the compare signal outputted from the comparison means 27 and when the detected signal pattern matches the film source signal pattern, which is to say, when the detected signal pattern is {"1", "1", "0", "1", "1"}, determines that the video source is a film source and outputs "1" as the determination signal, or when the detected signal pattern does not match the film source signal pattern, determines that the video source is not a film source and outputs "0" as the determination signal. It should be noted that this determination signal is also used as the control signal C2.

Figure 9:
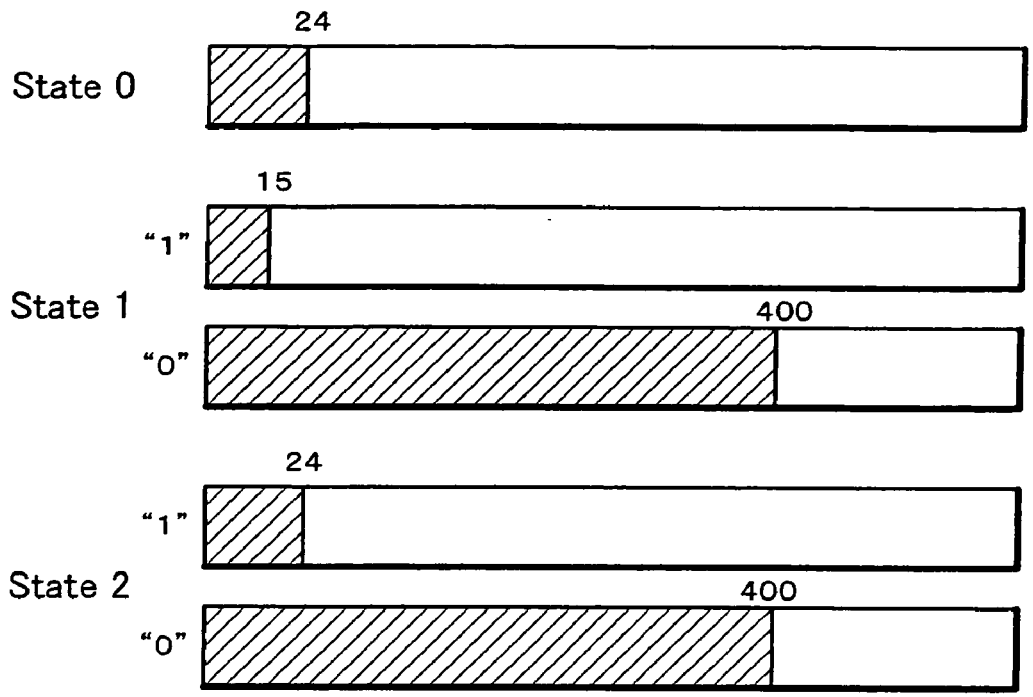
FIG. 9 shows the thresholds that are set in accordance with the states that are specified by the state transition means.

The following describes the setting process for the threshold by the threshold setting means. FIG. 9 shows the thresholds that are set in accordance with the states that are specified by the state transition means. When the state specifying signal inputted from the state transition means 14 shows state 0 showing that the film source signal pattern has not been detected, the threshold setting means 26 outputs 24 (around 5% of the total number of pixel blocks) as the threshold. In this case, if the count number for the number of pixel blocks that do not match exceeds 24, it is determined that the picture of the field provided by the video signal Fin does not match the picture of the field provided by the video signal F2 and the compare signal "1" is outputted from the comparison means 27. Next, when the state specifying signal inputted from the state transition means 14 is state 1 showing that the film source signal pattern has been detected, the threshold setting means 26 outputs 15 (around 3% of the total number of pixel blocks) as the threshold for fields where the output of "1" as the compare signal is predicted, and outputs 400 (around 80% of the total number of pixel blocks) as the threshold for fields where the output of "0" as the compare signal is predicted. By doing so, after it has been determined that the video source is a film source, it is possible to optimize the setting of the thresholds based on predictions of matching or not matching for the pictures in each field, so that the probability of detecting the film source signal pattern showing that the video source is a film source can be increased. Next, when the state specifying signal inputted from the state transition means 14 is state 2 showing a state where following the detection of the film source signal pattern, the film source signal pattern is no longer being detected and that a predetermined time has not yet passed, the threshold setting means 26 outputs 24 as the threshold for fields where the output of "1" as the compare signal is predicted, and outputs 400 as the threshold for fields where the output of "0" as the compare signal is predicted. By doing so, compared to state 1, the detection conditions for the film source signal pattern can be made slightly stricter.

Based on the processing described above, when it has been determined that the video source is a film source, the video source determining device 7 outputs "1" as the determination signal (the control signal C2) showing that the video source is a film source. In this case, as described above, the line doubling device 5 inputs video signals of fields generated from the same frame, performs the line doubling process, and outputs a progressive scan video signal based on a field in which the number of scan lines has been doubled. Progressive scan is used in this way as the scanning method for the output video signal for the following reasons. When the video source is a film source, the fields that are subjected to picture processing are an odd-numbered field and an even-numbered field that are obtained from the same picture, so that it is possible to obtain favorable picture quality for the picture of a field in which the number of scan lines has been doubled. However, when a field that has been subject to this kind of line doubling process is split once again into an odd-numbered field and an even-numbered field and outputted as a video signal using the interlaced scanning method, due to the high independence of the individual scan lines, it is easy for line flicker to occur. Accordingly, when it has been determined that the video source is a film source, a video signal is outputted using the progressive scanning method, thereby preventing the occurrence of line flicker.

According to the first embodiment described above, the video source determining device 7 is constructed of the calculating means 13 that calculates the degree of difference between the picture of the field provided by the video signal Fin and the picture of the field provided by the video signal F2, the threshold setting means 26 that outputs a threshold for determining whether the fields match, the comparison means 27 that compares the degree of difference outputted from the calculating means 13 and the threshold outputted from the threshold setting means 26 and determines whether the pictures of each field match, and the signal pattern detecting means 28 that detects the signal pattern for the compare signal outputted from the comparison means 27 and determines whether the video source is a film source, and thresholds that are appropriate for a variety of reception conditions and video signal input states, etc., can be outputted and the conditions for determining whether the pictures of fields match or do not match can be set flexibly, so that by increasing the probability of detecting the film source signal pattern, there is the effect that it is possible to supply an appropriate combination of video signals to the line doubling device 5 with a higher probability.

A state that changes according to the determination result for the video source is specified by the state transition means 14, and the threshold setting means 26 is constructed so as to output a different threshold in state 1 when it has been determined that the video source is a film source and in state 0 when it has been determined that the video source is not a film source, so that by setting appropriate thresholds according to the determination result for the video source, it is possible to increase the probability of detecting the film source signal pattern, and there is the effect that it is possible to supply an appropriate combination of video signals to the line doubling device 5 with a higher probability.

Since a construction is used where a suitable threshold for state 2 is outputted by the threshold setting means 26 during state 2 where following the detection of the film source signal pattern, the film source signal pattern is no longer detected but a predetermined time is yet to pass, the number of types of state that can be specified in accordance with the determination result for the video source is increased, and by setting appropriate thresholds for the respective states, it is possible to increase the probability of detecting the film source signal pattern, and there is the effect that it is possible to supply an appropriate combination of video signals to the line doubling device 5 with a higher probability.

Also, a construction is used where in the two states numbered state 1 and state 2, the threshold setting means 26 outputs different thresholds in a case where it is predicted that the fields will match and in a case where it is predicted that the fields will not match, so that after the video source has been determined to be a film source, it is possible to optimize the settings of the thresholds based on a prediction of whether the pictures of the fields will match or will not match, which makes it possible to increase the probability of detecting the film source signal pattern, and there is the effect that it is possible to supply an appropriate combination of video signals to the line doubling device 5 with a higher probability.

Also, when it has been determined that the video source is a film source, the line doubling device 5 is constructed so as to output a progressive scan video signal, so that there is the effect that the occurrence of line flicker can be avoided and favorable pictures can be supplied.

An Exemplified Practical Embodiment 2

Figure 10:
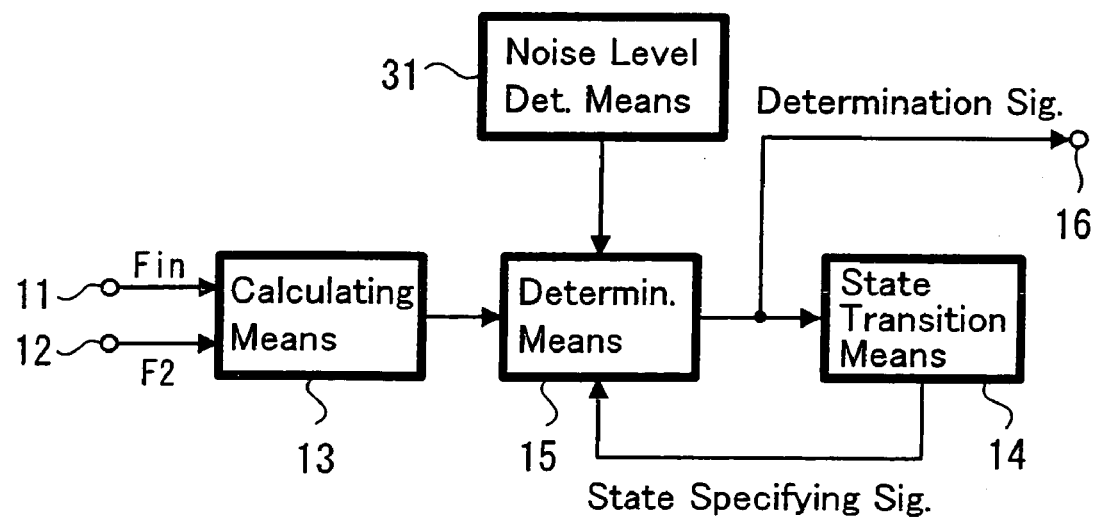
FIG. 10 is a block diagram showing the construction of a video source determining device in a video signal processing apparatus according to a second embodiment of the present invention.

FIG. 10 is a block diagram showing the construction of a video source determining device in a video signal processing apparatus according to a second embodiment of the present invention. In FIG. 10, the same reference numerals as FIG. 6 show the same or equivalent parts, so description of such has been omitted. Reference numeral 31 denotes a noise level detecting means that detects the electric field strength of a received broadcast wave, for example, and specifies the noise level of a video signal.

Next, the operation of the video signal processing apparatus according to the second embodiment is described. Processes such as the generation process for the video signals F1, F2, Fa, Fb, Fc, etc., the combination changing process for the video signals supplied to the line doubling device 5 based on the determination result of the video source, the counting process for the degree of difference between the pictures of each field, the determination process relating to whether the pictures of each field match, and the determination process for the video source are the same as in the first embodiment, so description of such has been omitted and the following description focuses on the operation relating to the setting of thresholds used when determining whether the pictures of each field match.

Figure 11:
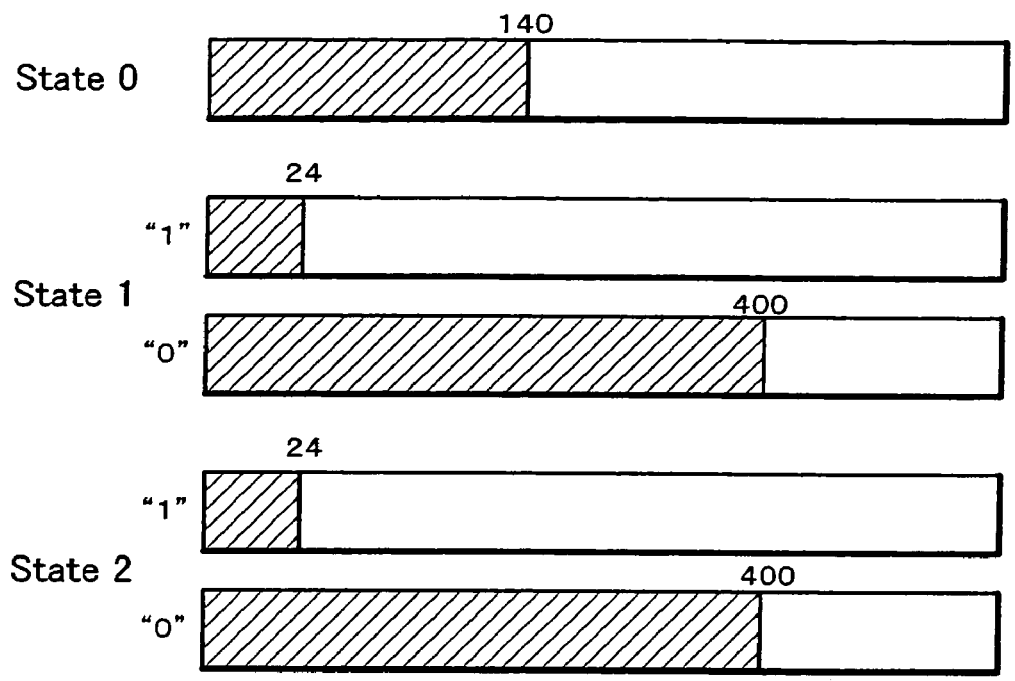
FIG. 11 shows the thresholds for the case where the noise level exceeds the tolerated range but is comparatively low.
Figure 12:
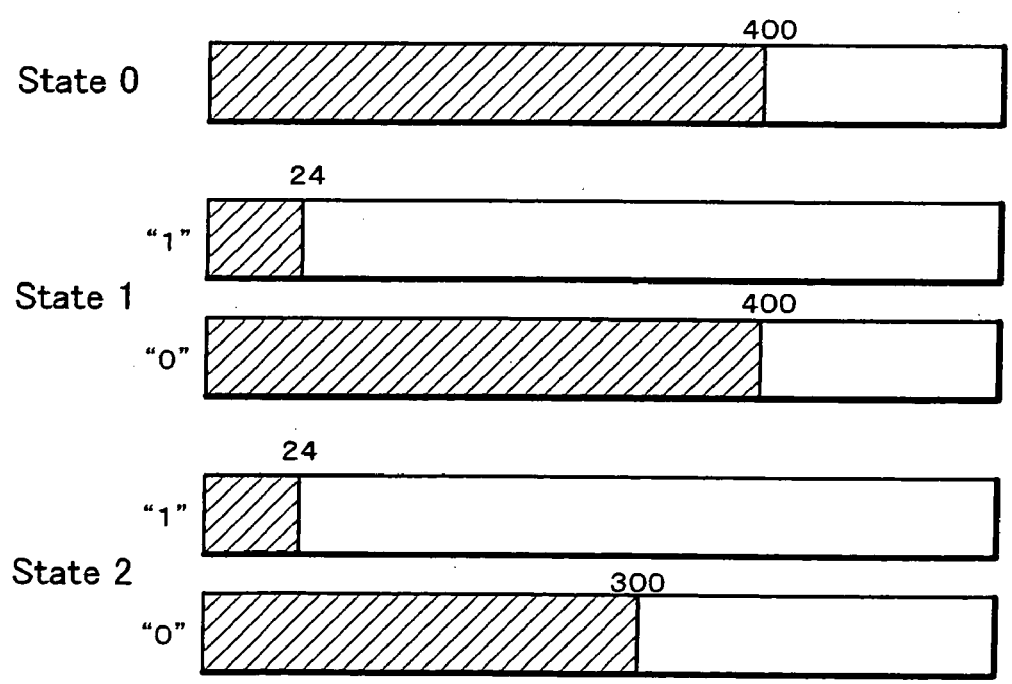
FIG. 12 shows the thresholds for the case where the noise level exceeds the tolerated range and is comparatively high.

The noise level detecting means 31 detects the electric field strength of a received broadcast wave, for example, and specifies the noise level in the video signal. The threshold setting means 26 in the determination means 15 inputs a signal showing the noise level from the noise level detecting means 31 and sets a different threshold in accordance with the noise level. As one example, if the noise level is in a tolerated range, thresholds such as those shown in FIG. 9 are set, and an appropriate threshold is outputted in accordance with each state and the predictions as to whether the pictures of each field match. Also, if the noise level exceeds the tolerated range, thresholds that are different to those shown in FIG. 9 are set. FIG. 11 shows the thresholds for the case where the noise level exceeds the tolerated range but is comparatively low. As shown in FIG. 11, by relaxing the determination conditions for the matching of pictures in each field, the probability of detecting the film source signal pattern is increased, and it is possible to supply an appropriate combination of video signals to the line doubling device 5 with a higher probability even when the video signal includes noise. FIG. 12 shows the thresholds for the case where the noise level exceeds the tolerated range and is comparatively high. As shown in FIG. 12, compared to the case where the noise level is comparatively low, the determination conditions for the matching of pictures in each field are relaxed further, so that the probability of detecting the film source signal pattern is increased, even when the video signal includes a lot of noise.

As described above, the second embodiment includes the noise level detecting means 31 for detecting the noise level of the video signal, and is constructed so as to set different thresholds in accordance with the noise level in at least one of the states out of the state 0, state 1, and state 2, so that by relaxing the determination conditions for the matching between pictures of each field, the probability of detecting the film source signal pattern can be increased even when the video signal includes noise, so that there is the effect that it is possible to supply an appropriate combination of video signals to the line doubling device 5 with a high probability even when the video signal includes noise.

An Exemplified Practical Embodiment 3

Figure 13:
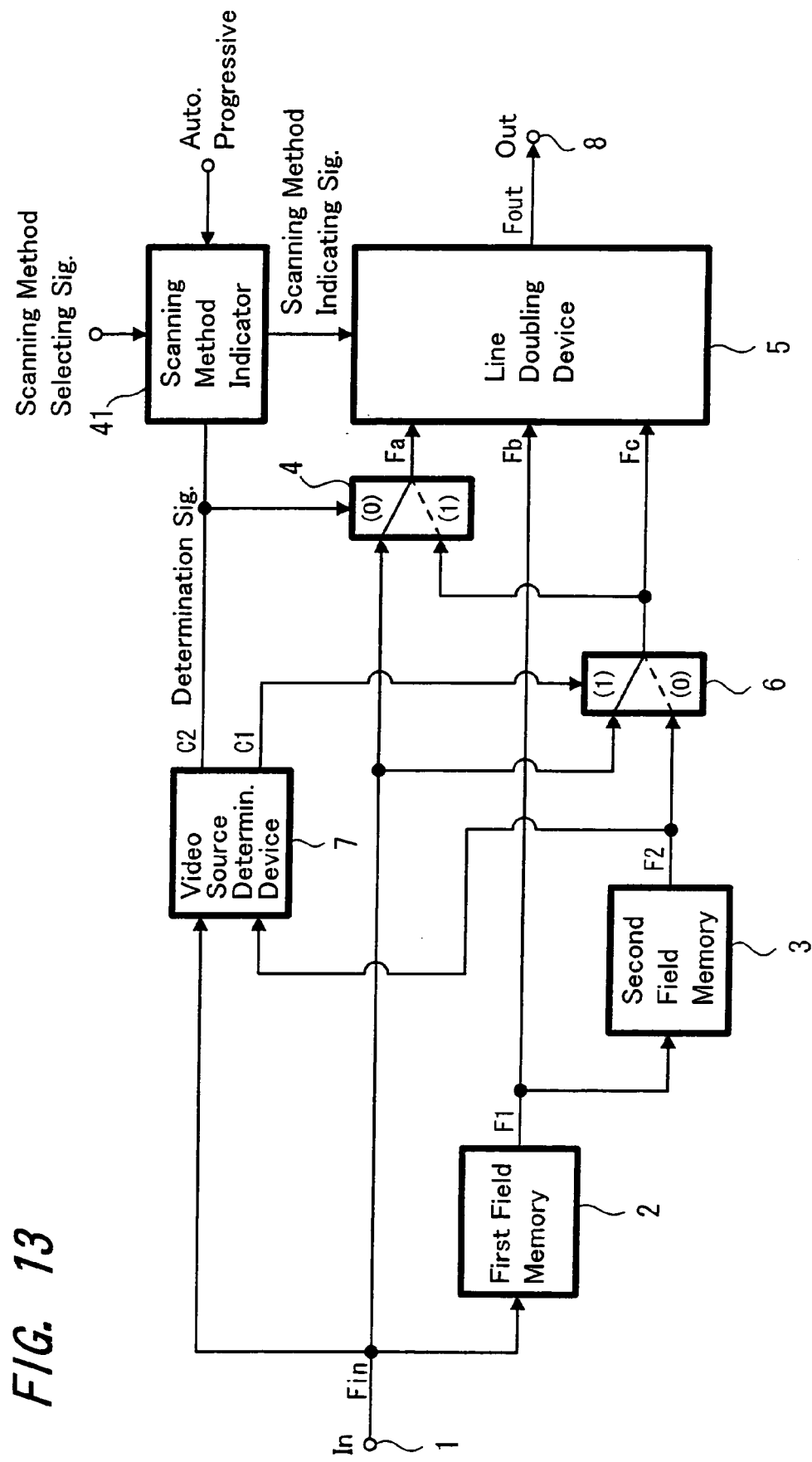
FIG. 13 is a block diagram showing the construction of a video signal processing apparatus according to a third embodiment of the present invention.
Figure 14:
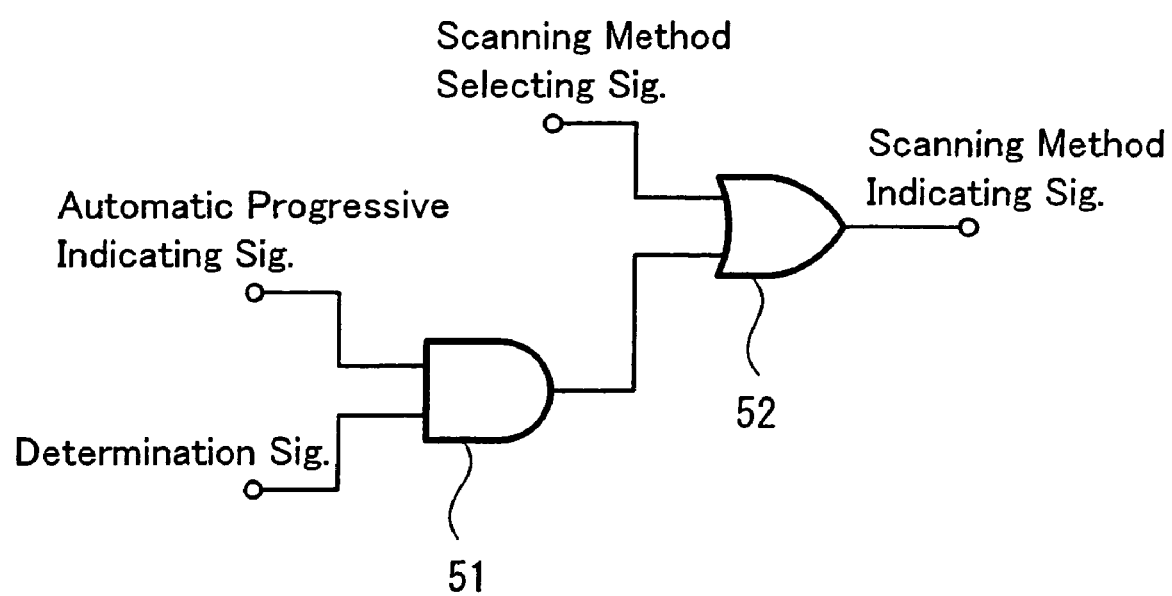
FIG. 14 is a circuit diagram showing one example of the construction of the scanning method indicator.

FIG. 13 is a block diagram showing the construction of a video signal processing apparatus according to a third embodiment of the present invention. In FIG. 13, the same reference numerals as FIG. 3 show the same or equivalent parts, so description of such has been omitted. Reference numeral 41 denotes a scanning method indicator (scanning method indicating means) that inputs a determination signal outputted from the video source determining device 7, as well as a scanning method selecting signal and an automatic progressive indicating signal that are described later and outputs a scanning method indicating signal that indicates the scanning method for the video signal outputted from the line doubling device 5. FIG. 14 is a circuit diagram showing one example of the construction of the scanning method indicator. In FIG. 14, reference numeral 51 denotes an AND gate that inputs the automatic progressive indicating signal and the determination signal and takes a logical AND for these signals, and reference numeral 52 denotes an OR gate that inputs the scanning method selecting signal and the output of the AND gate 51 and outputs a logical OR for both signals as the scanning method indicating signal.

The automatic progressive indicating signal is "1" in the case of a setting whereby when the video source is determined to be a film source, the scanning method of the video signal outputted from the line doubling device 5 is set at progressive scanning and "0" in the case of a setting whereby the scanning method of the video signal outputted from the line doubling device 5 is indicated in accordance with a user selection. As described above, the determination signal becomes "1" when the video source is a film source and "0" when the video source is not a film source. The scanning method selecting signal is "1" in a case where the scanning method of the video signal outputted from the line doubling device 5 is progressive scanning and "0" in a case where the scanning method of the video signal outputted from the line doubling device 5 is interlaced scanning. The scanning method indicating signal is "1" in a case where the scanning method of the video signal outputted from the line doubling device 5 is progressive scanning and "0" in a case where the scanning method of the video signal outputted from the line doubling device 5 is interlaced scanning.

The following describes the operation of the scanning method indicator. First, the case where when the automatic progressive indicating signal is "1", which is to say, a case where the scanning method of the video signal outputted from the line doubling device 5 is set at progressive scanning when it has been determined that the video source is a film source, is described. When it has been determined that the video source is a film source, the determination signal becomes "1", and in accordance with this the output signal of the AND gate 51 becomes "1" and the output signal of the OR gate 52, which is to say, the scanning method indicating signal, becomes "1", so that progressive scanning is set as the scanning method of the line doubling device 5. Also, when it has been determined that the video source is not a film source, the determination signal becomes "0", and in accordance with this the output signal of the AND gate 51 becomes "0". Accordingly, the scanning method indicating signal matches the scanning method selecting signal, and the line doubling device 5 outputs the video signal using the scanning method selected by the user. It should be noted that the signal value of the scanning method selecting signal can be changed at any time by the user operating a predetermined key.

Next, the case where when the automatic progressive indicating signal is "0", which is to say, a case where the scanning method of the video signal outputted from the line doubling device 5 is set according to a user selection, is described. In this case, the output signal of the AND gate becomes "0", so that the scanning method indicating signal matches the scanning method selecting signal and the line doubling device 5 outputs the video signal using the scanning method selected by the user. As can be understood from these operations, both (1) an automatic progressive indicating means that indicates progressive scanning as the scanning method when it has been determined that the video source is a film source, and (2) a user selection means that indicates the scanning method according to a user selection when the video source has been determined to not be a film source and the automatic progressive indicating means described above has been made impotent, are constructed from the AND gate 51 and the OR gate 52.

As described above, according to this third embodiment, the scanning method indicator 41 is provided with an automatic progressive indicating means that indicates progressive scanning as the scanning method when it has been determined that the video source is a film source, so that when it has been determined that the video source is a film source, progressive scanning can be automatically indicated as the scanning method of the video signal outputted from the line doubling device 5, which has the effect of making it possible to reliably avoid the occurrence of line flicker and provide favorable pictures.

Also, the scanning method indicator 41 is constructed so as to include a user selection means that indicates the scanning method in accordance with to a user selection when it has been determined that the video source is not a film source and the automatic progressive indicating means described above has been made impotent, so that the scanning method of the video signal outputted from the line doubling device 5 can be indicated in accordance with a user selection, which makes it possible to increase the functionality of the system.

It should be noted that the video signal processing apparatus, the video signal processing method, and video source determining method described in the first to third embodiments above are not limitative for the present invention, and these embodiments have been disclosed with the intention of illustrating the invention. The technical scope of the present invention is defined by the range of the patent claims, and a variety of design modifications are possible within the technical range disclosed by the range of the patent claims. For example, although the calculating means shown in FIG. 8 is constructed so as to calculate a degree of difference between the picture of the field provided by the video signal Fin and the picture of the field provided by the video signal F2, it is also possible to use a circuit construction that can calculate the degree of similarity between both pictures. In this case, a threshold to be compared with the degree of similarity to determine whether both pictures match or do not match is outputted from the threshold setting means 26. Also, the number of states that can be defined in the state transition means is not limited to three, and it is possible to define four or more states. Also, the scanning method indicator shown in FIG. 14 is not limited to the combination of the AND gate 51 and the OR gate 52 and can be realized by a variety of circuit configurations so long as the same logical process is performed.

The invention claimed is:

1. A video signal processing apparatus comprising:
video source determining means for inputting a video signal and a delayed video signal, produced by delaying said video signal by an equivalent of two fields, and determining whether a video source of the video signal is a film source; and
line doubling means for receiving an input of three video signals, generating a field in which the number of scan lines is increased, and outputting a video signal according to a scanning method out of interlaced scanning and progressive scanning,
wherein said video source determining means includes:
calculating means for calculating a degree of similarity or a degree of difference between a picture of a field provided by the video signal and a picture of a field provided by the delayed video signal;
threshold setting means for outputting a threshold for determining whether the pictures of each field match;
comparison means for comparing a calculated value relating to the degree of similarity or the degree of difference outputted from said calculating means and the threshold outputted from said threshold setting means and determining whether the pictures of each field match;
signal pattern detecting means for detecting a signal pattern for a compare signal outputted from said comparison means and determining whether the video source is a film source; and
state transition means for specifying a state that changes in accordance with a determination result for the video source, the state indicating at least when the video source has been determined to be a film source and when the video source has been determined to not be a film source;
wherein the threshold setting means outputs different thresholds based on the state specified by the state transition means.

2. A video signal processing apparatus according to claim 1, wherein in a state where following the video source being determined to be a film source, a predetermined time is yet to pass after the video source has been determined to not be a film source, the threshold setting means outputs a threshold in accordance with said state.

3. A video signal processing apparatus according to claim 1, wherein in one or a plurality of states, the threshold setting means outputs respectively different thresholds in a case where the pictures of fields are predicted to match and in a case where the pictures of fields are predicted to not match.

4. A video signal processing apparatus according to claim 1, wherein when the video source has been determined to be a film source, the line doubling means outputs a video signal using a progressive scanning method.

5. A video source determining method of determining a video source of a video signal in a video signal processing apparatus comprising video source determining means for inputting a video signal and a delayed video signal, produced by delaying said video signal by an equivalent of two fields, and determining whether a video source of the video signal is a film source and line doubling means for inputting three video signals, generating a field in which the number of scan lines is increased, and outputting a video signal according to a scanning method out of interlaced scanning and progressive scanning, wherein the video source determining method comprises:

- a step of calculating a degree of similarity or a degree of difference between a picture of a field provided by the video signal and a picture of a field provided by the delayed video signal;
- a step of outputting a threshold for determining whether the pictures of each field match;
- a step of comparing a calculated value relating to the degree of similarity or the degree of difference and the threshold and determining whether the pictures of each field match;
- a step of detecting a signal pattern of a time series for a signal showing whether the determined pictures of each field match or do not match, and determining whether the video source is a film source; and
- a step of specifying a state that changes in accordance with a determination result for the video source; the state indicating at least when the video source has been determined to be a film source and when the video source has been determined to not be a film source;

wherein in the step of outputting the threshold for determining whether the pictures in each field match, different thresholds are outputted based on the state specified in the specifying step.

6. A video source determining method according to claim 5, wherein in the step of outputting the threshold for determining whether the pictures in each field match, in a state where following the video source being determined to be a film source, a predetermined time is yet to pass after the video source has been determined to not be a film source, a threshold in accordance with said state is outputted.

7. A video source determining method according to claim 5, wherein in the step of outputting the threshold for determining whether the pictures in each field match, in one or a plurality of states, respectively different thresholds are outputted in a case where the pictures of fields are predicted to match and in a case where the pictures of fields are predicted to not match.

8. A video source determining method according to claim 5, wherein when the video source has been determined to be a film source, a video signal is outputted from the line doubling means using progressive scanning.

* * * * *